US012650850B2

(12) United States Patent
Yang et al.

(10) Patent No.: US 12,650,850 B2
(45) Date of Patent: Jun. 9, 2026

(54) METHOD AND APPARATUS FOR OBTAINING BOOT LOGS, AND METHOD FOR TRANSFERRING BOOT LOGS

(71) Applicant: SUZHOU METABRAIN INTELLIGENT TECHNOLOGY CO., LTD., Suzhou (CN)

(72) Inventors: Haoyu Yang, Suzhou (CN); Xinglong Wang, Suzhou (CN); Jinfeng Li, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/116,965

(22) PCT Filed: Mar. 22, 2024

(86) PCT No.: PCT/CN2024/083375
§ 371 (c)(1),
(2) Date: Mar. 28, 2025

(87) PCT Pub. No.: WO2024/244642
PCT Pub. Date: Dec. 5, 2024

(65) Prior Publication Data
US 2026/0003639 A1 Jan. 1, 2026

(30) Foreign Application Priority Data
May 26, 2023 (CN) .......................... 202310607938.9

(51) Int. Cl.
G06F 9/44 (2018.01)
G06F 9/4401 (2018.01)
(52) U.S. Cl.
CPC ................................. G06F 9/4403 (2013.01)

(58) Field of Classification Search
None
See application file for complete search history.

(56) References Cited

U.S. PATENT DOCUMENTS 5,884,073 A * 3/1999 Dent .................... G06F 11/2294
714/27
6,453,414 B1 * 9/2002 Ryu ....................... G06F 9/4406
713/2
(Continued)

FOREIGN PATENT DOCUMENTS

| CN | 106021064 A | 10/2016 |
| CN | 106155706 A | 11/2016 |
(Continued)

OTHER PUBLICATIONS

Machine translation of CN114443442, Espacenet, 2022 (Year: 2022).*
(Continued)

*Primary Examiner* — Danny Chan
(74) *Attorney, Agent, or Firm* — Scully, Scott, Murphy & Presser, P.C.

(57) ABSTRACT

A method for obtaining boot logs is provided. The method includes: determining an operating state of a target device, where the operating state includes: a normal operation state and an abnormal operation state; and in response to the operating state being the normal operation state, obtaining boot logs from a first target memory device in a BMC system of the target device, where the first target memory device is a transitory memory device, and the boot log is all logs of the target device in a boot process; or in response to the operating state being the abnormal operation state, obtaining the boot logs from a second target memory device in the target device, where the second target memory device is a memory device in the target device. An apparatus for (Continued)

obtaining boot logs and a method for transferring boot logs are further provided.

15 Claims, 5 Drawing Sheets

(56)                     References Cited

U.S. PATENT DOCUMENTS

| | | | | |
|---|---|---|---|---|
| 9,286,079 | B1 * | 3/2016 | Roden | G06F 12/0871 |
| 11,301,312 | B1 | 4/2022 | Kaila | |
| 2003/0196111 | A1 * | 10/2003 | Lampson | G06F 21/575 |
| | | | | 713/1 |
| 2013/0311625 | A1 * | 11/2013 | Cook | H04L 41/0813 |
| | | | | 709/221 |
| 2014/0372676 | A1 * | 12/2014 | Lee | G06F 16/27 |
| | | | | 711/103 |
| 2016/0323148 | A1 * | 11/2016 | Butcher | H04L 41/04 |
| 2018/0300202 | A1 * | 10/2018 | Lambert | G06F 9/4405 |
| 2019/0369913 | A1 * | 12/2019 | Hahn | G06F 3/0619 |
| 2020/0226262 | A1 * | 7/2020 | Yeh | G06F 11/3476 |
| 2022/0129258 | A1 * | 4/2022 | Ladkani | G06F 8/65 |
| 2024/0281345 | A1 * | 8/2024 | Umeda | G06F 11/1471 |

FOREIGN PATENT DOCUMENTS

| | | | |
|---|---|---|---|
| CN | 106339281 | A | 1/2017 |
| CN | 107515808 | A | 12/2017 |
| CN | 108197008 | A | 6/2018 |
| CN | 112035353 | A | 12/2020 |
| CN | 113721746 | A | 11/2021 |
| CN | 113806127 | A | 12/2021 |
| CN | 114168401 | A | 3/2022 |
| CN | 114443442 | A | 5/2022 |
| CN | 114691025 | A | 7/2022 |
| CN | 115576783 | A | 1/2023 |
| CN | 116383012 | A | 7/2023 |

OTHER PUBLICATIONS

The first search report of CN application No. 202310607938.9 issued on Jul. 5, 2023.
The search report of PCT application No. PCT/CN2024/083375 issue on Jun. 18, 2024.
The second search report of CN application No. 202310607938.9 issued on Jul. 26, 2023.
The first office action of CN application No. 202310607938.9 issued on Jul. 7, 2023.

* cited by examiner

Fig. 1

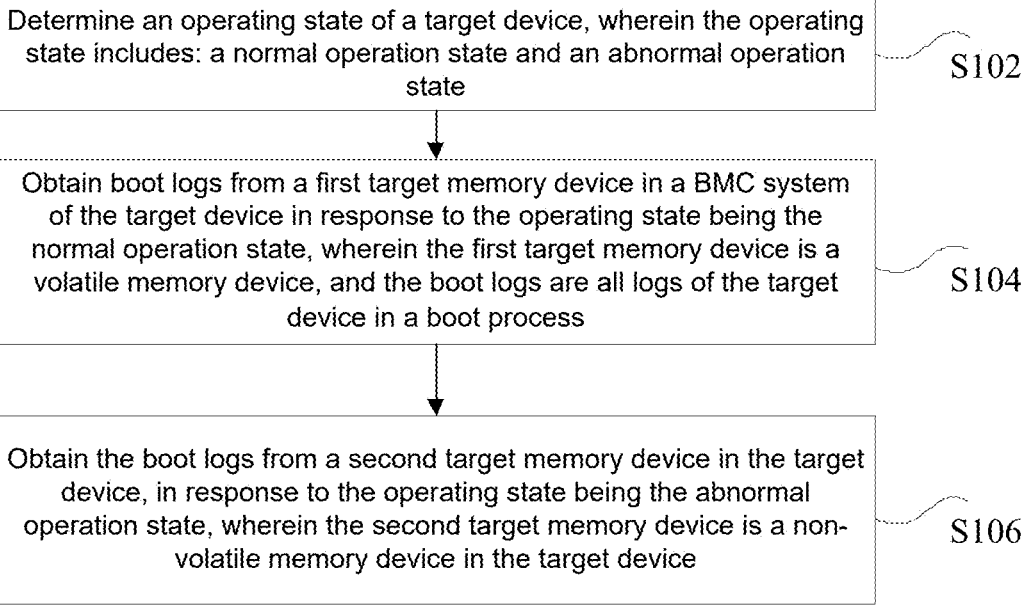

Determine an operating state of a target device, wherein the operating state includes: a normal operation state and an abnormal operation state — S102

Obtain boot logs from a first target memory device in a BMC system of the target device in response to the operating state being the normal operation state, wherein the first target memory device is a volatile memory device, and the boot logs are all logs of the target device in a boot process — S104

Obtain the boot logs from a second target memory device in the target device, in response to the operating state being the abnormal operation state, wherein the second target memory device is a non-volatile memory device in the target device — S106

Fig. 2

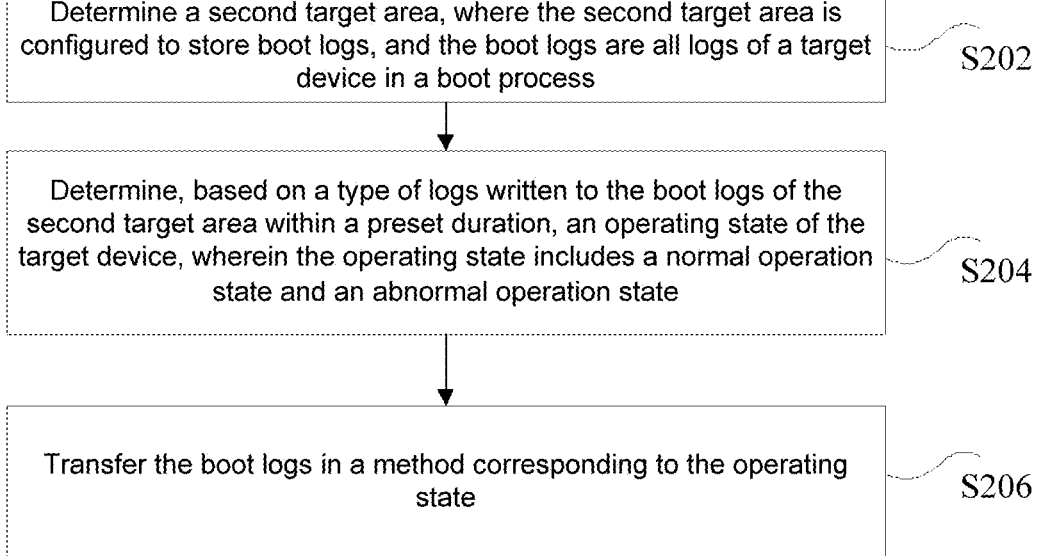

Determine a second target area, where the second target area is configured to store boot logs, and the boot logs are all logs of a target device in a boot process — S202

Determine, based on a type of logs written to the boot logs of the second target area within a preset duration, an operating state of the target device, wherein the operating state includes a normal operation state and an abnormal operation state — S204

Transfer the boot logs in a method corresponding to the operating state — S206

METHOD AND APPARATUS FOR OBTAINING BOOT LOGS, AND METHOD FOR TRANSFERRING BOOT LOGS

CROSS-REFERENCE TO RELATED APPLICATION

This disclosure claims priority to Chinese Patent Application No. 202310607938.9, filed with the China National Intellectual Property Administration on May 26, 2023 and entitled "Method and Apparatus for Obtaining Boot Logs, and Method for Transferring Boot Logs", which is incorporated herein by reference in its entirety.

TECHNICAL FIELD

This disclosure relates to the field of data transmission technologies, and in particular, to a method and an apparatus for obtaining boot logs, and a method for transferring boot logs.

BACKGROUND

Basic Input/Output System (BIOS) boot logs are used to record a boot state in a boot process of a server during the period when the server is powered on until an Operating System (OS) is started. The BIOS boot logs include information and results of initialization processes of a Central Processing Unit (CPU), a memory device, and an Input/Output (I/O) device, information loaded by a driver, and information of function modules defined by BIOS developers. Therefore, the BIOS boot logs are important for server operation and maintenance, server status monitoring, and error diagnosis and analysis. However, in related technologies, the boot logs are obtained by updating firmware and reproducing an abnormality of the server. Therefore, resources are wasted by performing reproduction operations multiple times, and valid boot logs are not collected because the abnormality cannot be reproduced.

Currently, there is no effective solution to resolve the foregoing problems.

SUMMARY

Embodiments of this disclosure provide a method and an apparatus for obtaining boot logs, and a method for transferring boot logs, to resolve technical problems of low efficiency and long time for collecting the boot log, which are caused by collecting the boot log through operations such as restarting a server, updating firmware, and reproducing an abnormality in related technologies.

According to an aspect of an embodiment of this disclosure, a method for obtaining boot logs is provided. The method includes: determining an operating state of a target device, where the operating state includes: a normal operation state and an abnormal operation state; and in response to the operating state being the normal operation state, obtaining boot logs from a first target memory device in a Baseboard Management Control (BMC) system of the target device, where the first target memory device is a transitory memory device, and the boot logs are all logs of the target device in a boot process; or in response to the operating state being the abnormal operation state, obtaining the boot logs from a second target memory device in the target device, where the second target memory device is a non-transitory memory device in the target device.

In an embodiment, the determining an operating state of a target device includes: receiving an Intelligent Platform Management Interface (IPMI) command, and in response to the IPMI command, starting a timing program, and starting timing, where a timing duration is a preset duration; and detecting the first target memory device within the preset duration, to obtain a detection result, and determining the operating state of the target device based on the detection result.

In an embodiment, the detection result includes the first target memory device receiving the boot logs within the preset duration, or the first target memory device not receiving the boot logs within the preset duration.

In an embodiment, the determining the operating state of the target device based on the detection result includes: in response to the detection result indicates that the first target memory device receives the boot logs within the preset duration, determining the operating state of the target device as the normal operation state; or in response to the detection result indicates that the first target memory device does not receive the boot logs within the preset duration, determining the operating state of the target device as the abnormal operation state.

In an embodiment, the method for obtaining a boot log further includes: after detecting that the first target memory device receives the boot logs within the preset duration, stopping timing, and resetting the timing program.

In an embodiment, the obtaining boot logs from a second target memory device in the target device includes: determining, in the second target memory device, a second target area used for storing the boot logs; and performing, via an expansion interface, dumping in the second target area, to obtain the boot logs.

In an embodiment, the determining, in the target device, a second target area used for storing the boot logs includes: receiving a first address and a data capacity of the second target area, where the data capacity is a maximum data storage volume of the second target area; determining an end address of the second target area based on the first address and the data capacity; and determining space from the first address to the end address in the second target memory device as the second target area.

In an embodiment, the obtaining boot logs from a first target memory device in a BMC system of the target device includes: determining a target storage area in the first target memory device, where the target storage area is a predetermined storage area that is dedicated to storing the boot logs; and reading the boot logs from the target storage area.

In an embodiment, after the obtaining a boot log from a first target memory device in a BMC system of the target device, the method further includes: dumping the boot logs to a third target memory device, where the third target memory device is a non-transitory memory device in the BMC system.

According to another aspect of an embodiment of this disclosure, a method for transferring boot logs is provided. The method includes: determining a second target area, where the second target area is configured to store boot logs, and the boot logs are all logs of a target device in a boot process; determining an operating state of the target device based on a type of logs written to the boot logs of the second target area within a preset duration, where the operating state includes a normal operation state and an abnormal operation state; and transferring the boot logs in a method corresponding to the operating state.

In an embodiment, the transferring the boot logs in a method corresponding to the operating state includes: in response to a target type of logs exists in the boot logs written to the second target area within the preset duration, transferring the boot logs to a first target memory device after the target type of logs is written to the second target area.

In an embodiment, the determining a second target area includes: determining a first address of the second target area and a data capacity of the second target area, where the data capacity is a maximum data storage volume of the second target area; determining an end address of the second target area based on the first address and the data capacity; and determining space from the first address to the end address in a second target memory device as the second target area.

In an embodiment, after the determining a second target area, the method for transferring a boot log includes: sending the first address and the data capacity to a BMC system in the target device via an IPMI command.

In an embodiment, the determining an operating state of the target device based on a type of logs written to the boot logs of the second target area within a preset duration includes: reading the boot logs written to the second target area within the preset duration, and determining a type of each log in the boot logs; and in response to a target type of logs does not exist in the boot logs, determining that the operating state of the target device is the abnormal operation state, wherein a log of the target type of logs is a log indicating that the target device completes a self-test; or in response to the target type of logs exists in the boot log, determining that the operating state of the target device is the normal operation state.

In an embodiment, the transferring the boot logs in a method corresponding to the operating state includes: in response to the operating state of the target device being the normal operation state, determining a first target memory device in a BMC system of the target device after determining that the target type of logs is written to the second target area, where the first target memory device is a transitory memory device; and writing the boot logs to the first target memory device in a Direct Memory Access (DMA) manner.

In an embodiment, the determining a first target memory device in a BMC system of the target device includes: determining a plurality of transitory memory devices that perform data transfer with the target device via a peripheral component interconnect express Peripheral Component Interconnect Express (PCIe) link; and determining, as the first target memory device, a transitory memory device that is among the plurality of transitory memory devices and in data communication with the BMC system.

In an embodiment, the boot logs are written to the second target memory device in the following method: determining a quantity of bytes of a first to-be-written boot log, and determining a new address based on the first address and the quantity of bytes, where the first to-be-written boot log is a log, currently to be written to the second target area, in the boot logs, the new address is a start address at which a second to-be-written boot log is written to the second target area after the first to-be-written boot log is written to the second target area, and the second to-be-written boot log is a log that follows the first to-be-written boot log; comparing the new address with the end address, to obtain a comparison result; and in response to the new address being greater than the end address, refusing to write the first to-be-written boot log to the second target area; or in response to the new address being less than or equal to the end address, allowing to write the first to-be-written boot log to the second target area.

In an embodiment, a method for transferring a boot log further includes: modifying a read object of the second target area to a basic input output system Basic Input/Output System (BIOS) of the target device by the BIOS of the target device and an operating system of the target device.

According to another aspect of an embodiment of this disclosure, a server is provided. The server includes: a BMC, a BIOS module, and a memory device, wherein the memory device is configured to store boot logs of the server; the BIOS module is configured to transfer the boot logs in the memory device to the BMC when the server operates normally; and the BMC is configured to dump the boot logs from the memory device when the server operates abnormally.

In an embodiment, the BIOS module is further configured to send the boot logs to the BMC in a DMA manner.

In an embodiment, the BMC is further configured to obtain the boot logs from the memory device via an expansion interface, and store the boot logs in a non-transitory storage device of the BMC.

According to another aspect of an embodiment of this disclosure, a method for transferring boot logs is further provided. The method includes: determining a first target memory device, wherein the first target memory device is a transitory memory device in a management system of a target device; receiving a boot command, and starting a timing program based on the boot command, where the timing program is configured to control the target device to perform timing for a preset duration; determining an operating state of the target device based on an operation result of the timing program, where the operating state includes a normal operation state and an abnormal operation state; and transferring boot logs in a method corresponding to the operating state, where the boot logs are all logs of the target device in a boot process.

According to another aspect of an embodiment of this disclosure, an apparatus for obtaining boot logs is provided. The apparatus includes: a determining module, configured to determine an operating state of a target device, where the operating state includes: a normal operation state and an abnormal operation state; a first obtaining module, configured to obtain boot logs from a first target memory device in a baseboard management control Baseboard Management Control (BMC) system of the target device in response to the operating state being the normal operation state, wherein the first target memory device is a transitory memory device, and the boot logs are all logs of the target device in a boot process; and a second obtaining module, configured to obtain the boot logs from a second target memory device in the target device when the operating state is the abnormal operation state, wherein the second target memory device is a non-transitory memory device in the target device.

According to another aspect of an embodiment of this disclosure, a non-transitory readable storage medium, where the non-transitory readable storage medium stores a computer program, and the non-transitory readable storage medium performs, in a device by running the computer program, the method for obtaining boot logs and the method for transferring boot logs.

According to another aspect of an embodiment of this disclosure, an electronic device is further provided, including a memory and a processor, where the memory stores a computer program, and the processor is configured to perform, via the computer program, the method for obtaining boot logs and the method for transferring boot logs.

In this embodiment of this disclosure, the method includes: determining an operating state of a target device, where the operating state includes: a normal operation state and an abnormal operation state; and in response to the operating state being the normal operation state, obtaining boot logs from a first target memory device in a Baseboard Management Control (BMC) system of the target device, wherein the first target memory device is a transitory memory device, and the boot logs are all logs of the target device in a boot process; or in response to the operating state being the abnormal operation state, obtaining the boot logs from a second target memory device in the target device, wherein the second target memory device is a non-transitory memory device in the target device. The boot logs are stored in fixed memory space by determining the fixed memory space of a memory stick of the server. Because all logs generated during a boot process of the server are stored in the fixed memory space, the purpose of obtaining all the logs generated during the boot process of the server is achieved. Because different methods for transferring boot logs are provided based on different operating states of the server, when the server operates abnormally, a purpose of obtaining boot logs that record an abnormal operation state without performing reproduction operations is achieved, and purposes of saving resources and reducing a time for obtaining the boot logs are achieved. This implements the technical effect of improving the problem analysis efficiency of the server, thereby resolving technical problems of low efficiency and long time for collecting the boot logs, which are caused by collecting the boot logs through operations such as restarting a server, updating firmware, and reproducing an abnormality in related technologies.

BRIEF DESCRIPTION OF THE DRAWINGS

The drawings described here are provided for further understanding of this disclosure, and constitute a part of this disclosure. The exemplary embodiments of this disclosure and illustrations thereof are intended to explain this disclosure, but do not constitute inappropriate limitations to this disclosure. In the accompanying drawings:

FIG. 1 is a flowchart of a method for obtaining boot logs according to an embodiment of this disclosure;

FIG. 2 is a flowchart of a method for transferring boot logs according to an embodiment of this disclosure;

DETAILED DESCRIPTION OF THE EMBODIMENTS

Figure 3:
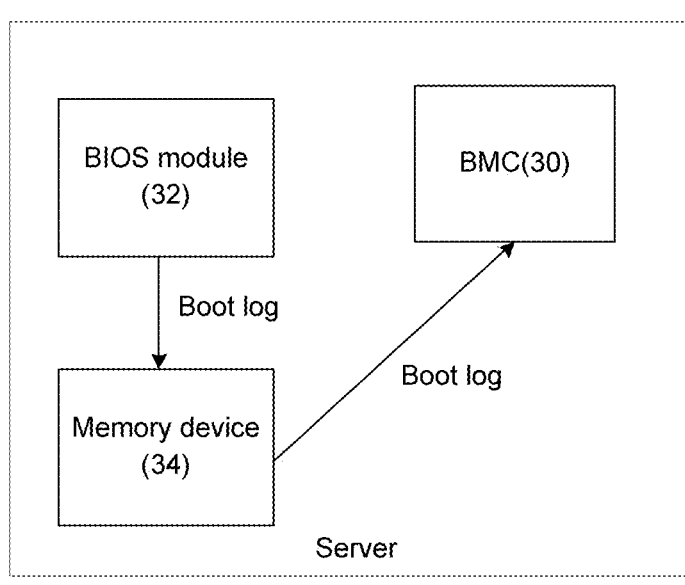
FIG. 3 is a structural diagram of a server according to an embodiment of this disclosure.

In order to enable those skilled in the art to better understand the solutions of this disclosure, the following clearly and completely describes solutions in embodiments of this disclosure with reference to the accompanying drawings in embodiments of this disclosure. Apparently, the described embodiments are merely a part rather than all of embodiments of this disclosure. All other embodiments obtained by a person of ordinary skill in the art based on embodiments of this disclosure without creative efforts shall fall within the scope of the protection of this disclosure.

It should be noted that, in the specification, claims, and accompanying drawings of this disclosure, terms "first", "second", and so on are intended to distinguish between similar objects but do not necessarily indicate a order or sequence. It should be understood that data used in such a way is interchangeable in a proper circumstance, so that embodiments of this disclosure described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device.

To better understand embodiments of this disclosure, the following introduces technical terms involved in embodiments of this disclosure:

BIOS: a set of programs solidified on a flash (Flash) memory chip on a baseboard in a service area. The BIOS stores the most important basic input output program of a computer, system setup information, a power-on self-test program, and a system bootstrap program. The BIOS is first loaded when the computer is started, is initialized before an operating system runs, detects each hardware, and sets parameters.

Boot log: The BIOS is first loaded when the computer is started. Therefore, a system log of the BIOS that is output in a boot process of the computer is called a boot log. The boot log includes names, models, statuses, and performance parameters of devices such as a processor, a memory, a hard disk drive, a display adapter, and the like. The boot log further includes information such as an error, a warning, or a prompt in the boot process of the computer.

Baseboard Manager Controller (BMC): an independent system that does not depend on other hardware on a system (for example, a CPU, a memory, and the like), and does not depend on a BIOS, an Operating System (OS), and the like. The BMC may interact with the BIOS, to better play a role in platform management. As a server platform management system, the BMC can communicate with the BIOS in a plurality of manners.

Transitory memory device: a memory device that retains, through continuous power supply, stored data in the memory device. For example, when power of a Random-Access Memory (RAM) is off, all data in the transitory memory device is erased.

Non-transitory memory device: a memory device with a persistent storage capability. When power is off, stored data in the memory device can be retained, or when the power is restored, original stored data in the memory device can be recovered. The non-transitory memory device is configured to store data for a long time.

Watch dog: an electronic timer or a software timer.

I/O operation: transfer data between a CPU and an external devices (for example, a disk and a network). The I/O operation needs to be processed by an I/O controller and another hardware device, with a slow speed.

Memory read/write operation: directly exchange data between a CPU and a memory device. Data is read or written by accessing a memory address.

Dumping: copy, move, or back up data from a storage device or system to another storage device or system. A file on a disk can be stored into an external device (for example, a USB drive) by dumping, and an entire database can be completely copied and then stored into another server by dumping.

In the related technologies, to collect the boot logs, the BIOS firmware must be updated or a BIOS debugging function needs to be enabled. This requires rebooting a server where the BIOS is located, and then collecting the boot logs during a rebooting process of the server. Therefore, there is a problem that only immediate boot logs of the server can be collected and the past boot logs cannot be obtained. In addition, when the server has an operating abnormality and the boot process of the server is interrupted, boot logs that records information of the abnormality of the server can only be obtained by reproducing an abnormal state of the server. Therefore, because a duration of collecting the boot logs that records information of the abnormality of the server is long, efficiency in analyzing a reason for the abnormality of the server is low. In addition, because the abnormal state of the server cannot be reproduced, effective boot logs cannot be collected, and reasons for the abnormality of the server cannot be analyzed. To resolve the problem, in view of two operating states of the server, embodiments of this disclosure provide two different methods for transferring boot logs. Fixed memory space that is used for storing the boot logs is determined in a memory stick of the server, the boot logs of the server are stored in the fixed space, and the operating state of the server is determined by determining whether a self-test log (BIOS Post Complete) exists in the boot logs of the server. When it is determined that the server operates normally, the memory space actively transfers the boot logs; and when it is determined that the server operates abnormally, logs in the memory space are obtained via a BMC on a motherboard of the server, which resolves the above problems as described in detail below.

According to embodiments of this disclosure, a method embodiment of a method for transferring boot logs is provided. It should be noted that, steps shown in the flowchart in the accompanying drawings may be executed in a computer system such as a set of computer-executable instructions. Moreover, although a logic sequence is shown in the flowchart, the shown or described steps may be executed in a sequence different from that described here.

FIG. 1 is a flowchart of a method for obtaining boot logs according to an embodiment of this disclosure. As shown in FIG. 1, the method includes the following steps.

Step S102: determine an operating state of a target device, wherein the operating state includes: a normal operation state and an abnormal operation state.

In this embodiment of this disclosure, the method for transferring the boot logs is described in detail by using an example in which a server is used as the target device and BIOS boot logs of the server is collected. A baseboard of the server or any computer includes: a memory device (for example, a memory stick), a flash memory chip that is capable of transferring data with a memory device and to which a BIOS program is written, and a BMC system capable of interacting the memory device with data. In the step S102, the BMC determines whether an operating state of the server (that is, the target device) is the normal operation state or the abnormal operation state when a boot process is executed.

According to an optional embodiment of this disclosure, the determining an operating state of a target device includes: receiving an Intelligent Platform Management Interface (IPMI) command, and in response to the IPMI command, starting a timing program, and starting timing, where a timing duration is a preset duration; and detecting a first target memory device within the preset duration, to obtain a detection result, and determining the operating state of the target device based on the detection result.

When the server operates normally, the server (that is, the target device) transfers the boot logs to a transitory memory device (that is, the first target memory device) of the server (for example, the target device) after a self-test is completed. In this embodiment, the BMC determines the operating state of the server by detecting whether the server receives the boot logs within the preset duration. An optional method is as follows: after the server is powered on and booted, BIOS code is loaded, and the server is initialized, the BIOS sends a boot command to the BMC in the form of the IPMI command, and the BMC receives the boot command, starts executing a watch dog (that is, a timing program), performs timing within the preset duration, detects, while performing timing, whether the transitory memory device (that is, the first target memory device) receives the boot logs. Finally, the BMC determines the operating state of the server based on the detection result.

According to another optional embodiment of this disclosure, the determining the operating state of the target device based on the detection result includes: in response to the detection result indicates that the first target memory device receives the boot logs within the preset duration, determining the operating state of the target device as the normal operation state; in response to the detection result indicates that the first target memory device does not receive the boot logs within the preset duration, determining the operating state of the target device as the abnormal operation state.

In this embodiment, the detection result (that is, an operation result) output by the watch dog includes two cases: Case 1, the transitory memory device (that is, the first target memory device) receives the boot logs within the preset duration; and case 2, the transitory memory device (that is, the first target memory device) does not receive the boot logs within the preset duration. In response to the detection result output by the watch dog is the Case 1, it indicates that the server (that is, the target device) can be successfully powered on, and it is determined that the operating state of the target device is the normal operation state. In response to the detection result output by the watch dog is the Case 2, it indicates that the boot process of the server is interrupted, and it is determined that the operating state of the target device is the abnormal operation state.

Step S104: in response to the operating state is the normal operation state, obtain the boot logs from a first target memory device in the BMC system of the target device, where the first target memory device is a transitory memory device, and the boot logs are all logs of the target device in a boot process.

The server (that is, the target device) stores the boot logs that are generated by executing the boot process in a time period from powering on and booting the server to completing the boot process in a non-transitory memory device (that is, the second target memory device) of the server, for example, in the memory stick. Therefore, in the step S104, in response to the server (that is, the target device) normally executes the boot process (that is, operates normally) and the server completes the self-test, the boot logs stored in the non-transitory memory device (that is, the second target memory device) in the server will be transferred to a transitory memory device (that is, the first target memory device) (Host to BMC Bridge, H2B) in the BMC. Thus the boot logs are extracted from the transitory memory device (that is, the first target memory device) in the BMC system when the server operates normally. The boot logs record information such as an error, a warning, or a prompt that occurs in the boot process of the server, and information such as a model and a name of an electronic device in the server.

According to some optional embodiments of this disclosure, the obtaining boot logs from a first target memory device in a BMC system of the target device includes: determining a target storage area in the first target memory device, where the target storage area is a predetermined storage area that is dedicated to storing the boot logs; and reading the boot logs from the target storage area.

In some embodiments, before the boot logs are obtained from the transitory memory device (that is, the first target memory device) in the BMC system, the H2B is first addressed, an area (that is, the target storage area) that is determined by the BMC and the BIOS and that is configured to store the boot logs is searched in the H2B, an address of the area (that is, the target storage area) that is configured to store the boot logs is determined, and subsequently, when the server (that is, the target device) operates normally, the boot logs are read from the area indicated by the address.

According to some optional embodiments of this disclosure, after the obtaining boot logs from a first target memory device in a BMC system of the target device, the method for obtaining the boot logs further includes: dumping the boot logs to a third target memory device, where the third target memory device is a non-transitory memory device in the BMC system.

In some other embodiments, the purpose of obtaining the boot logs is to store the boot logs for a long time, to subsequently analyze the server using the boot logs. Data cannot be stored in the non-transitory memory device for a long time, and data is easily lost. To store the data for a long time, after the boot logs are obtained from a non-transitory memory device (that is, the first target memory device) of the BMC, the boot logs are stored in the non-transitory memory device (that is, a third target memory device) that is in the BMC system and that is only allowed to be accessed by the BMC.

It should be noted that the boot logs obtained in this embodiment of this disclosure is ultimately stored in the non-transitory memory device (that is, the third target memory device) that is in the BMC system and that allow only the BMC to access. Therefore, the boot logs in the non-transitory memory device (that is, the second target memory device) in the server are ultimately stored in the non-transitory memory device (that is, the third target memory device) that is in the BMC system and that are only allowed to be accessed by the BMC.

According to an optional embodiment of this disclosure, the method for obtaining the boot logs further includes: after detecting that the first target memory device receives the boot logs within the preset duration, stopping timing, and resetting the timing program.

In this embodiment, if the server (that is, the target device) operates normally and it is detected that the transitory memory device (that is, the first target memory device) receives the boot logs, the timing operation performed in a current watch dog is stopped, to output the detection result that the target device operates normally. In addition, a watch dog in the BMC is reset, to restore the timing program to a default value, thereby ensuring that timing performed next time still starts from 0.

Step S106: in response to the operating state being the abnormal operation state, obtain the boot logs from a second target memory device in the target device, where the second target memory device is a non-transitory memory device in the target device.

In the step S106, in response to the server (that is, the target device) does not complete the boot process (that is, operates abnormally), the boot logs are still stored in the non-transitory memory device (that is, the second target memory device). In this case, the BMC actively obtains the boot logs of the server from the non-transitory memory device (that is, the second target memory device).

It should be noted that the non-transitory memory device (that is, the second target memory device) in the server may be a hardware storage device, for example, a memory stick. The storage device is divided into an exclusive area for storing the boot logs, and the exclusive area for storing the boot logs is only allowed to be accessed and modified by the basic input output system BIOS of the server, but not allowed to be accessed and modified by a source operating system (Operating System, OS) of the server. The exclusive area is not visible to the OS.

According to an optional embodiment of this disclosure, the obtaining boot logs from a second target memory device in the target device includes: determining, in the second target memory device, a second target area configured to store the boot logs; and performing, via an expansion interface, dumping in the second target area, to obtain the boot logs.

In this embodiment, when the server (that is, the target device) operates abnormally, the BMC actively obtains the boot logs from the non-transitory memory device (the second target memory device) of the target device. When the BMC obtains the boot logs from the second target memory device, the BMC first determines memory space (that is, the second target area) that is in the second target memory device and that is dedicated to storing the boot logs, and then invokes an interface on a communication chip in the BMC to perform dumping in memory space of the memory device of the target device, to implement reading and writing for the memory. For example, the boot logs may be dumped via a remote extend debug port (Extended Debug Port, XDP).

According to an optional embodiment of this disclosure, the determining, in the target device, a second target area used for storing the boot log includes: receiving a first address and a data capacity of the second target area, where the data capacity is a maximum data storage volume of the second target area; determining an end address of the second target area based on the first address and the data capacity; and determining space from the first address to the end address in a second target memory device as the second target area.

After the server is powered on, booted, and initialized, the BIOS determines, in the non-transitory memory device (the second target memory device) of the target device, the memory space (that is, the second target area) that is dedicated to storing the boot logs of the server, and after the determining, sends the start address (the first address) of the memory space (that is, the second target area) and the maximum data storage volume (that is, the data capacity) of the space are sent to the BMC. In this embodiment, after receiving the start address (the first address) and the data capacity that are sent by the BIOS, the BMC converts the first address and the data capacity into a same number system, and determines, based on the same positional number system, the ending address (end address) of the memory space (that is, the second target area) that is dedicated to storing the boot logs of the server. Subsequently, when the server operates abnormally and the BMC reads the boot logs from the non-transitory memory device (the second target memory device) of the target device, the start address (the first address) is used as a start location for reading the boot logs, and the ending address (the end address) is used as an ending location for reading the boot logs. Only data in a section from the start address (the first address) to the ending address (the end address) is read. For example, in response to the first address received by BMC is 0x10000000 and the data capacity is 2 megabytes (MByte), after receiving 0x10000000 and 2 M, the BMC first converts 2 M to a hexadecimal system, that is, to 0x200000, and then calculates a sum of the first address 0x10000000 and the data capacity 0x200000. The sum of the first address and the data capacity is the end address, that is, the end address is 0x102000000. When reading the data in the non-transitory memory device of the target device (the second target memory device), the BMC reads only data between the addresses 0x10000000 and the address 0x102000000.

The method for transferring the boot logs is replaced by a memory read/write operation from a traditional I/O operation by performing the foregoing steps. When the operating state of the target device is the abnormal operation state, operations such as restarting, changing firmware, or changing the configuration of the firmware does not need to be performed, reducing the dependence on the firmware. In addition, a reproduction operation does not need to be performed, improving a speed of transferring the boot logs, thereby improving a speed of analyzing reasons that the operating state of the target device is the abnormal operation state.

FIG. 2 is a flowchart of a method for transferring boot logs according to another aspect of an embodiment of this disclosure. As shown in FIG. 2, the method includes the following steps.

Step S202: determine a second target area, where the second target area is configured to store the boot logs, and the boot logs are all logs of a target device in a boot process.

For a BIOS, in the step S202, the BIOS determines, in a memory device of the server (that is, the target device), memory space (that is, the second target area) that is configured to store all system logs (that is, the boot log) of the target device in the boot process, where the memory device of the target device is a non-transitory memory device, and the boot logs record information such as an error, a warning, or a prompt that occurs in the boot process of the server, and information such as a model and a name of an electronic device in the server.

According to an optional embodiment of this disclosure, the determining a second target area includes: determining a first address of the second target area and a data capacity of the second target area, where the data capacity is a maximum data storage volume of the second target area; determining an end address of the second target area based on the first address and the data capacity; and determining space from the first address to the end address in a second target memory device as the second target area.

In this embodiment, after the server (that is, the target device) is powered on, BIOS code is loaded, and in addition, the target device is initialized. After the memory device in the server is initialized, space between two different addresses in the memory device is determined as fixed memory space (that is, the second target area), and the fixed memory space (that is, the second target area) is initialized. The two different addresses in the memory device are a first address and an end address respectively, where the first address is a memory address that is recorded in the BIOS and set in advance. The end address is an address that is indicated by a sum of a first address and a data capacity of the fixed memory space (that is, the target area). The data capacity of the fixed memory space (that is, the second target area) is a quantity of bytes that is recorded in the BIOS and that is set in advance, and is configured to indicate a maximum data storage volume of the fixed memory space (that is, the second target area), which is usually 2 megabytes (MByte).

According to some optional embodiments of this disclosure, after the determining a second target area, the method for transferring boot logs includes: sending the first address and the data capacity to a BMC system in the target device via an IPMI command.

In some optional embodiments, after determining the fixed memory space (that is, the second target area) that is in the memory device and that is configured to storing the boot logs, the BIOS sends the first address and the data capacity of the fixed memory space (that is, the second target area) to the BMC in the form of the IPMI command, to inform the BMC of the address at which the boot logs are stored in the memory device.

Step S204: determine, based on a type of logs written to the boot logs of the second target area within a preset duration, an operating state of the target device, where the operating state includes a normal operation state and an abnormal operation state.

In the boot process of the server (that is, the target device), the BIOS writes the boot logs into the memory space (that is, the second target area) one by one in a generation order. The boot logs include a self-test log of the server and information such as a model and a name of an electronic device in the server. When the BIOS writes the self-test logs of the server into the memory space (that is, the second target area), it indicates that the target device completes the boot process. That is, the target device operates normally. Therefore, in the step S204, whether the operating state of the target device is the normal operation state or the abnormal operation state is determined by determining whether the self-test logs are written to the memory space (that is, the second target area).

According to an optional embodiment of this disclosure, the determining, based on a type of logs written to the boot logs of the second target area within a preset duration, an operating state of the target device includes: reading the boot logs written to the second target area within the preset duration, and determining a type of each log in the boot logs; and in response to a target type of logs does not exist in the boot logs, determining that the operating state of the target device is the abnormal operation state, wherein a log of the target type of logs is a log indicating that the target device completes a self-test; or in response to the target type of logs exists in the boot logs, determining that the operating state of the target device is the normal operation state.

In this embodiment, the server (that is, the target device) stores, one by one in memory space of a non-transitory memory device (that is, the second target area) in the server, the boot logs generated by executing the boot process after the server is powered on and booted, and after completing the self-test, transfers all the boot logs generated in the time period from booting to the completion of the self-test to the fixed space (that is, the first target area) of the H2B that is predetermined by the BMC and the BIOS. Whether self-test logs (that is, the target type of the log) are written to the memory space (that is, the second target area) of the non-transitory memory device in the server is determined within the preset duration. The preset duration is preset, and a time length of the preset duration is greater than a duration from a time point at which the server is powered on to a time point at which the self-test logs are transferred to the fixed space (that is, the first target area) of the H2B. That is, in this embodiment of this disclosure, a sufficiently long duration is set for detecting the operating state of the server, to ensure that a determining result of the operating state of the server is not affected by the preset duration. Each log that is written to the memory space (that is, the second target area) of the non-transitory memory device in the server within the preset duration is read, and the type of each log is determined. In response to no self-test log (that is, the target type of the log) exists in the boot logs written to the memory space (that is, the second target area) of the non-transitory memory device in the server within the preset duration, it is indicated that the server is not powered on and the server operates abnormally. In response to the self-test log (that is, the target type of the log) exists in the boot logs written to the memory space (that is, the second target area) of the non-transitory memory device in the server within the preset duration, it is indicated that the server is successfully powered on and the server operates normally.

Step S206: transfer the boot logs in a method corresponding to the operating state.

In the step S206, after the operating state of the server (that is, the target device) is determined by performing the step S204, different methods for transferring the boot logs are provided based on different operating states of the server, where transferring methods corresponding to different operating states are different.

According to an embodiment of this disclosure, the transferring the boot logs in a method corresponding to the operating state includes: in response to the operating state of the target device being the normal operation state, determining a first target memory device in a BMC system of the target device after determining that the target type of logs is written to the second target area, where the first target memory device is a transitory memory device; and writing the boot log to the first target memory device in a Direct Memory Access (DMA) manner.

In this embodiment of this disclosure, two operating states, namely, the normal operation state and the abnormal operation state are defined for the server (that is, the target device) by determining whether the BIOS transfers the self-test log (that is, the target type of logs) to the target area within the preset duration. Therefore, there are two methods for transferring the boot logs in this embodiment. Methods for transferring the boot logs corresponding to different operating states are different, and trigger conditions for the different methods are also different. In this embodiment, in response to the operating state of the target device being the normal operation state, and the trigger condition is that the target device completes the boot, after the BIOS writes the self-test log to the memory space (that is, the second target area) of the non-transitory memory device in the server, the transitory storage device H2B (that is, the first target memory device) that is predetermined by the BIOS and the BNC is determined in the BMC, and the boot logs are written to the H2B in a direct memory access (Direct Memory Access, DMA) manner.

According to some optional embodiments of this disclosure, the determining a first target memory device in a BMC system of the target device includes: determining a plurality of transitory memory devices that perform data transfer with the target device via a Peripheral Component Interconnect Express (PCIe) link; and determining, as the first target memory device, a transitory memory device that is among the plurality of transitory memory devices and in data communication with the BMC system.

In some optional embodiments, the transitory storage device H2B (that is, the first target memory device) is selected from the plurality of transitory storage devices that are connected to the server via the PCIe link. The BIOS and the BMC predetermine, in a H2B, the fixed area (that is, the first target area) that is configured to store the boot logs, the BIOS writes the boot logs to the target area in the H2B, and the BMC reads the boot logs from the H2B, so that the H2B is writeable and readable to both the BMC and the BIOS, that is, writeable and readable to both the BMC and the server. Therefore, the H2B that is in the plurality of transitory storage devices connected to the server and that is capable of communicating with the BMC is determined as a target transitory storage device (that is, the first target memory device).

By performing the above steps, in a boot process of the BIOS, after a memory is initialized, an area with a fixed memory address and a fixed memory size is designated in the memory, and is configured ro store the boot logs of the BIOS. When the target device operates normally and after the self-test of the BIOS is completed, the boot logs are transferred, in the DMA manner, to an H2B area that is accessible to both the server and the BMC, to implement the collection of the boot logs. When the server operates abnormally, dumping (dump) is directly performed in the memory via an XDP tool, to obtain current boot logs of the BIOS. This improves log collection efficiency.

According to an embodiment of this disclosure, the boot logs are written to the second target memory device in the following method: determining a quantity of bytes of a first to-be-written boot log, and determining a new address based on the first address and the quantity of bytes, where the first to-be-written boot log is a log, currently to be written to the second target area, in the boot logs, the new address is a start address at which a second to-be-written boot log is written to the second target area after the first to-be-written boot log is written to the second target area, and the second to-be-written boot log is a log that follows the first to-be-written boot log; comparing the new address with the end address, to obtain a comparison result; and in response to the new address being greater than the end address, refusing to write the first to-be-written boot log to the second target area; or in response to the new address being less than or equal to the end address, allowing to write the first to-be-written boot log to the second target area.

In this embodiment, when the boot logs are written one by one to the memory space (that is, the second target area) of the non-transitory memory device in the server, a method for defining a global variable is used to ensure that written data does not go out of bounds. The method includes the following steps: to make a distinction, in this embodiment, the memory space (that is, the second target area) of the non-transitory memory device in the server is defined as an area "BIOS DEBUG INFO AREA", pointer global variables are defined as P_start and P_end, where P_start is a start address (a first address) of "BIOS DEBUG INFO AREA", and P_end is an ending address (an end address) of "BIOS DEBUG INFO AREA" determined based on the first address and the data capacity; and a value of P_end is a value obtained by offsetting an initial value of P_start backward by a size of a memory area of "BIOS DEBUG INFO AREA". Before each boot log is written to "BIOS DEBUG INFO AREA", a data volume of a to-be-written boot log is obtained, to determine a size of a memory occupied by the to-be-written boot log, and P_start is offset backward by the size of the memory occupied by the to-be-written boot log, to obtain a new end address (a new address) of an area obtained after the to-be-written boot log is written to "BIOS DEBUG INFO AREA". In response to the new end address (that is, the new address) being greater than P_end, it indicates that the to-be-written boot log is out of bounds after being written. Therefore, it is refused to write the to-be-written boot log to "BIOS DEBUG INFO AREA". On the contrary, in response to the new end address (that is, the new address) being less than P_end, it indicates that the to-be-written boot log is not of bounds after being written. Therefore, it is allowed to write the to-be-written boot log to "BIOS DEBUG INFO AREA". In addition, after the to-be-written boot log is written to "BIOS DEBUG INFO AREA", a next log is written from a new first address, where the new first address is an address obtained after the original first address is offset backward by a size of a memory occupied by a previous log message; and a process of checking whether an out-of-bounds error occurs is repeated after each log is written.

According to some optional embodiments of this disclosure, a method for transferring the boot logs further includes: modifying a read object of the second target area to a Basic Input/Output System (BIOS) of the target device by the BIOS of the target device and an operating system of the target device.

In some optional embodiments, after the BIOS determines, in the non-transitory memory device of the server, the memory space (that is, a second target area) that is dedicated to storing the boot logs, the BIOS modifies read and write permissions of the memory space (that is, the second target area). After modification, the memory space (that is, the second target area) is only allowed to be accessed and modified by the BIOS, and is not visible to the operating system OS of the server. In an embodiment, an Advanced Configuration and Power Management Interface (ACPI) table that records the configuration and interfaces of the server may be obtained, memory space (that is, the second target area) recorded in the ACPI table may be modified to the BIOS by the BIOS and the OS.

FIG. 3 is a structural diagram of a server according to an embodiment of this disclosure. As shown in FIG. 3, the server includes: a BMC (30), a BIOS module (32), and a memory device (34). The memory device (34) is configured to store the boot logs of the server. The BIOS module (32) is configured to transfer the boot logs in the memory device to the BMC when the server operates normally. The BMC (30) is configured to dump the boot logs from the memory device when the server operates abnormally.

According to an embodiment of this disclosure, the BIOS module (32) is further configured to send the boot logs to the BMC in a DMA manner.

In this embodiment, when the server operates normally and after it is detected that the memory device receives the self-test log of the server, the boot logs in the memory device is sent to the transitory memory device H2B in the BMC in the DMA manner.

According to an embodiment of this disclosure, the BMC is further configured to obtain the boot logs from the memory device via an expansion interface, and store the boot logs in a non-transitory storage device of the BMC.

In this embodiment, when the server operates abnormally, the BMC invokes an XDP to dump, in a non-transitory storage device EEPROM of the BMC, the memory that is in the memory device and that is configured to store the boot logs.

Figure 4:
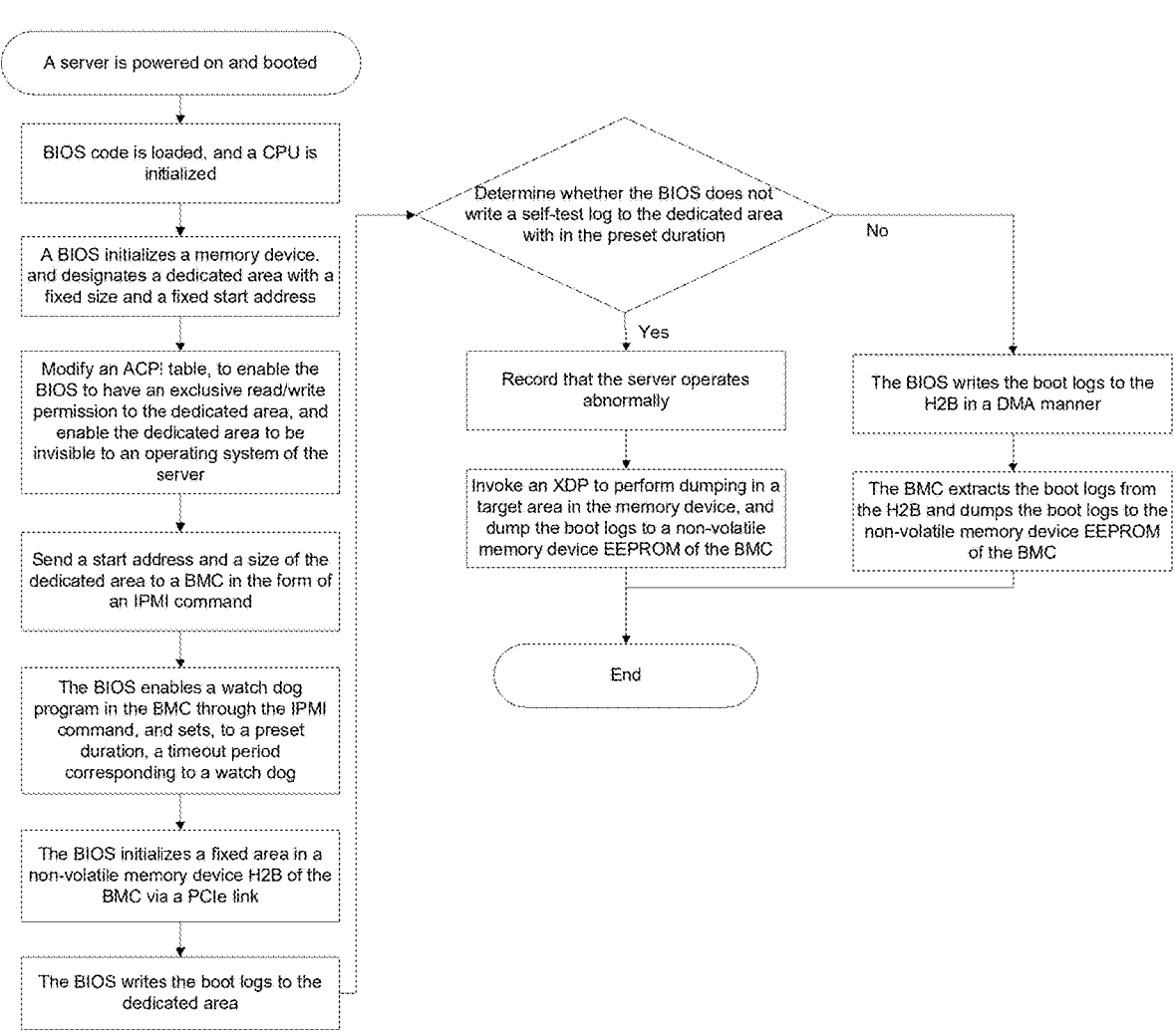
FIG. 4 is a flowchart of a server transferring boot logs according to an embodiment of this disclosure.

FIG. 4 is a flowchart of a server transferring boot logs. As shown in FIG. 4, after the server is powered on and booted, BIOS code is loaded, and a CPU in the server is initialized. After the initialization is completed, the BIOS initializes a memory device and designates a dedicated area with a fixed size and a fixed start address. The dedicated area is configured to store boot logs. After the dedicated area is determined, an ACPI table of the server is modified, to enable the BIOS to have an exclusive read/write permission to the dedicated area, and enable the dedicated area to be invisible to an operating system of the server. Then, the BIOS sends the IPMI command to the BMC, and sends a start address and a size of the dedicated area to the BMC in the form of the IPMI command. In addition, the BIOS enables a watch dog program in the BMC through the IPMI command, and sets, to a preset duration, a timeout period corresponding to a watch dog. Before the boot logs are output, the BIOS initializes a fixed area in a non-transitory memory device H2B of the BMC via the PCIe link. The fixed area is configured to temporarily store the boot logs of the server. When the server executes a boot process, the BIOS writes the boot logs to the dedicated area, and the watch dog detects whether the BIOS does not write a self-test log to the dedicated area within the preset duration. In response to the BIOS writes the self-test log to the dedicated area within the preset duration, the BIOS writes the boot logs to the H2B in the DMA manner. After the boot logs are written to the H2B, the BMC extracts the boot logs from the H2B and dumps the boot logs to a non-transitory memory device EEPROM of the BMC, to enable the boot logs to be persistently stored. In response to the BIOS does not write the self-test log to the dedicated area within the preset duration, the BMC records that the server operates abnormally, invokes the XDP to perform dumping in the target area in the memory device, and dumps the boot logs to the non-transitory memory device EEPROM of the BMC, to enable the boot logs to be persistently stored.

Figure 5:
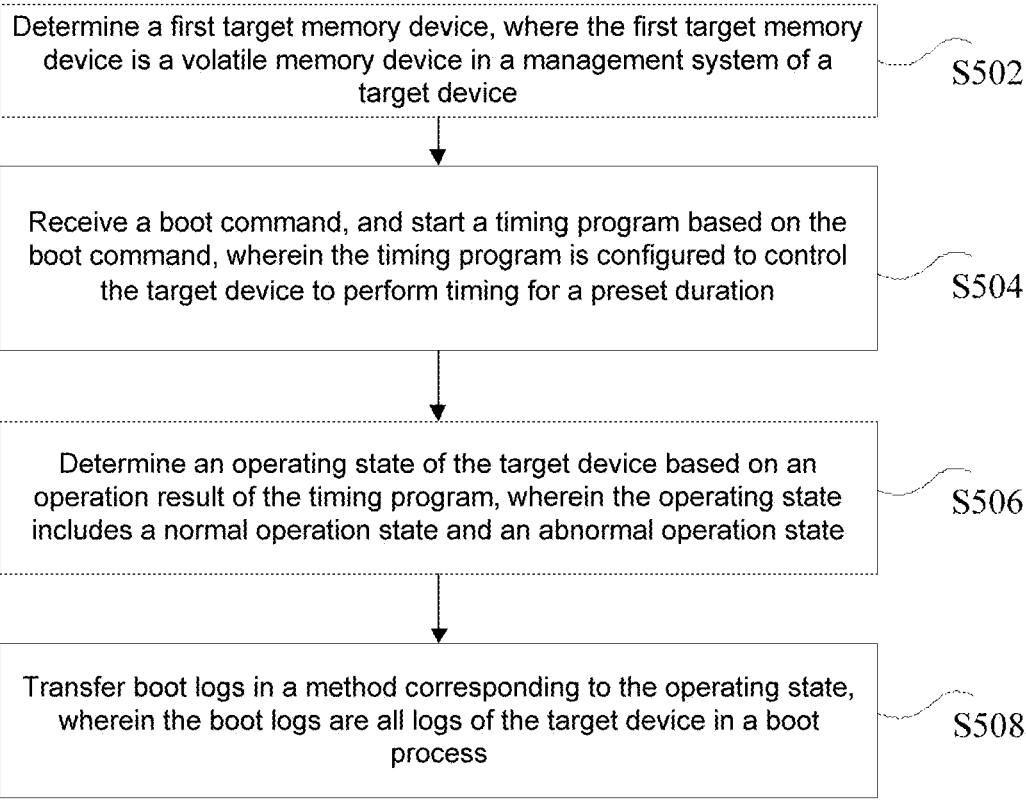
FIG. 5 is a flowchart of another method for transferring boot logs according to an embodiment of this disclosure.

FIG. 5 is a flowchart of a method for transferring boot logs according to another aspect of an embodiment of this disclosure. As shown in FIG. 5, the method includes the following steps.

Step S502: determine a first target memory device, where the first target memory device is a transitory memory device in a management system of a target device.

In the step S502, the BMC system of the server determines, in a plurality of transitory storage devices in the server system, a transitory storage device that is configured to temporarily store the boot logs.

Step S504: receive a boot command, and start a timing program based on the boot command, where the timing program is configured to control the target device to perform timing for a preset duration.

In the step S504, the BMC receives the boot command and starts the timing program after receiving the boot command, and a timing duration of the timing program is set to the preset duration.

Step S506: determine an operating state of a target device based on a running result of the timing program, where the operating state includes: a normal operation state and an abnormal operation state.

In the step S506, after the timing program is started in the step S504, the operating state of the target device is detected via the timing program, to determine whether the target device operates normally or abnormally.

Step S508: transfer the boot logs in a method corresponding to the operating state, where the boot logs are all logs of the target device in a boot process.

In the step S508, after the operating state of the target device is determined by performing the step S506, the boot logs are transferred in the method corresponding to the operating state. The operating state of the target device includes the normal operation state and the abnormal operation state. Methods corresponding to different operating states are different.

Figure 6:
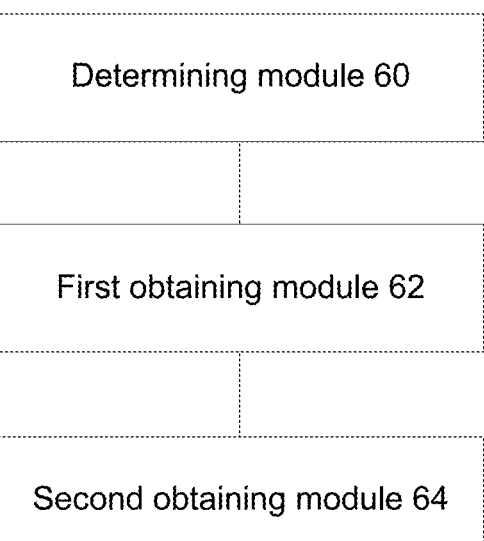
FIG. 6 is a structural diagram of an apparatus for obtaining boot logs according to an embodiment of this disclosure.

FIG. 6 is a structural diagram of an apparatus for obtaining boot logs according to an embodiment of this disclosure. The apparatus includes: a determining module 60, configured to determine an operating state of a target device, where the operating state includes: a normal operation state and an abnormal operation state; a first obtaining module 62, configured to obtain boot logs from a first target memory device in a BMC system of the target device when the operating state is the normal operation state, where the first target memory device is a transitory memory device, and the boot logs are all logs of the target device in a boot process; and a second obtaining module 64, configured to obtain the boot logs from a second target memory device in the target device when the operating state is the abnormal operation state, where the second target memory device is a memory device in the target device.

It should be noted that, for optional implementations of the embodiment shown in FIG. 6, refer to related descriptions in the embodiment shown in FIG. 1. Details are not described herein again.

According to another aspect of an embodiment of this disclosure, a non-transitory readable storage medium, where the non-transitory readable storage medium stores a computer program, and the non-transitory readable storage medium performs, in a device by running the computer program, the method for obtaining boot logs and the method for transferring the boot logs.

The non-transitory readable storage medium is configured to store a program that performs the following functions: determining an operating state of a target device, where the operating state includes: a normal operation state and an abnormal operation state; and in response to the operating state being the normal operation state, obtaining boot logs from a first target memory device in a baseboard management control BMC system of the target device, wherein the first target memory device is a transitory memory device, and the boot logs are all logs of the target device in a boot process; or in response to the operating state is the abnormal operation state, obtaining the boot logs from a second target memory device in the target device, where the second target memory device is a memory device in the target device.

The non-transitory readable storage medium is further configured to store a program that performs the following functions: determining a second target area, wherein the second target area is configured to store the boot logs, and the boot logs are all logs of a target device in a boot process; determining, based on a type of logs written to the boot logs of the second target area within a preset duration, an operating state of the target device, where the operating state includes the normal operation state and the abnormal operation state; and transferring the boot logs in a method corresponding to the operating state.

According to another aspect of an embodiment of this disclosure, an electronic device is further provided, including a memory and a processor, where the memory stores a computer program, and the processor is configured to perform, via the computer program, the method for obtaining boot logs and the method for transferring boot logs.

The processor in the electronic device is configured to run a program that performs the following functions: determining the operating state of a target device, where the operating state includes: the normal operation state and the abnormal operation state; and in response to the operating state being the normal operation state, obtaining boot logs from a first target memory device in a BMC system of the target device, where the first target memory device is a transitory memory device, and the boot logs are all logs of the target device in a boot process; or in response to the operating state being the abnormal operation state, obtaining the boot logs from a second target memory device in the target device, where the second target memory device is a memory device in the target device.

The processor in the electronic device is further configured to run a program that performs the following functions: determining a second target area, where the second target area is configured tor store boot logs, and the boot logs are all logs of a target device in a boot process; determining, based on a type of logs written to the boot logs of the second target area within a preset duration, an operating state of the target device, where the operating state includes a normal operation state and an abnormal operation state; and transferring the boot logs in a method corresponding to the operating state.

It should be noted that, each module of the apparatus for obtaining boot logs may be a program module (for example, a set of program instructions for implementing functions), or may be a hardware module. For the latter, the hardware module may include the following forms, but is not limited to: each module is a processor, or functions of each module are implemented via a processor.

The serial numbers of embodiments of this disclosure are merely for description and do not represent a preference of embodiments.

In the above embodiments of this disclosure, the description of embodiments each has a focus, and portions not described in detail in one embodiment may refer to the description of other embodiments.

In several embodiments provided in this disclosure, it should be understood that the disclosed technical content may be implemented in various manners. For example, the described apparatus embodiment is merely illustrative. For example, the unit division is merely logical function division and may be other division in actual implementation. For example, a plurality of units or components may be combined or integrated into another system, or some features may be ignored or not performed. In other respects, the inter-coupling or direct coupling or communication connection shown or discussed may be indirect coupling or communication connection through some interfaces, units, or modules, or may be implemented in an electrical or other forms.

The units described as separate parts may or may not be physically separate, and parts displayed as units may or may not be physical units, may be located in one position, or may be distributed on a plurality of units. Some or all of the units may be selected based on actual requirements to achieve the objectives of the solutions of embodiments.

In addition, functional units in embodiments of this disclosure may be integrated into one processing unit, or each of the units may exist alone physically, or two or more units are integrated into one unit. The foregoing integrated unit may be implemented in a form of hardware, or may be implemented in a form of software functional unit.

When the integrated unit is implemented in the form of software functional unit and sold or used as an independent product, the integrated unit may be stored in a non-transitory readable storage medium. Based on such an understanding, the solutions of this disclosure essentially, or a part contributing to the related art, or some or all of the solutions may be embodied in a form of a software product. The computer software product is stored on a non-transitory readable storage medium, and includes several instructions to enable a computer device (which may be a personal computer, a server a network device, or the like) to execute all or some steps of the methods according to embodiments of this disclosure. The foregoing non-transitory readable storage medium includes: a USB flash disk, a read-only memory (ROM), a random access memory (RAM), a mobile hard disk, a magnetic disk, an optical disc, or other media capable of storing program code.

The above are merely optional implementations of this disclosure. It should be noted that a person of ordinary skill in the art may further make several improvements and modifications without departing from the principle of this disclosure, but such improvements and modifications should be deemed as falling within the protection scope of this disclosure.

What is claimed is:

1. A method for obtaining boot logs, comprising:
determining an operating state of a target device, wherein the operating state comprises: a normal operation state and an abnormal operation state;
wherein the determining an operating state of a target device comprises: detecting the first target memory device within a preset duration, to obtain a detection result, and determining the operating state of the target device based on the detection result, wherein the detection result comprises detecting whether the first target memory device receiving the boot logs within the preset duration;
wherein the determining the operating state of the target device based on the detection result comprises:
in response to the detection result indicating that the first target memory device receives the boot logs within the preset duration, determining the operating state of the target device as the normal operation state;
in response to the detection result indicating that the first target memory device does not receive the boot logs within the preset duration, determining the operating state of the target device as the abnormal operation state;
wherein in the normal operation state, writing the boot logs to the first target memory device in a Baseboard Management Control (BMC) system using Direct Memory Access (DMA); and
in response to the operating state being the normal operation state, obtaining boot logs from the first target memory device in the BMC of the target device, wherein the first target memory device is a transitory memory device, and the boot logs are all logs of the target device in a boot process;
in response to the operating state being the abnormal operation state, obtaining the boot logs from a second target memory device in the target device, wherein the second target memory device is a non-transitory memory device in the target device;
wherein the obtaining boot logs from the second target memory device in the target device in the abnormal operation state comprises:
determining, in the second target memory device, a second target area used for storing the boot logs; and
performing, via an expansion interface, dumping from the second target area, to obtain the boot logs; and
wherein after the obtaining boot logs from a first target memory device in a BMC system of the target device in the normal operation state, dumping the boot logs to a third target memory device, wherein the third target memory device is a non-transitory memory device in the BMC system.

2. The method as claimed in claim 1, wherein the determining an operating state of a target device comprises:
receiving an Intelligent Platform Management Interface (IPMI) command, and in response to the IPMI command, starting a timing program, and starting timing, wherein a timing duration is a preset duration.

3. The method as claimed in claim 2, wherein the method further comprises: after detecting that the first target memory device receives the boot logs within the preset duration, stopping timing, and resetting the timing program.

4. The method as claimed in claim 1, wherein the determining, in the target device, a second target area used for storing the boot logs comprises:
receiving a first address and a data capacity of the second target area, wherein the data capacity is a maximum data storage volume of the second target area;
determining an end address of the second target area based on the first address and the data capacity; and
determining space from the first address to the end address in the second target memory device as the second target area.

5. The method as claimed in claim 1, wherein the obtaining boot logs from a first target memory device in a BMC system of the target device comprises:
determining a target storage area in the first target memory device, wherein the target storage area is a predetermined storage area that is dedicated to storing the boot logs; and reading the boot logs from the target storage area.

6. A method for transferring boot logs, comprising:
determining a second target area in a second target memory device of a target device, wherein the second target area is configured to store boot logs, and the boot logs are all logs of the target device in a boot process;
determining an operating state of the target device based on a type of logs written to the boot logs of the second target area within a preset duration, wherein the operating state comprises a normal operation state and an abnormal operation state; and
transferring the boot logs in a method corresponding to the operating state;
wherein the transferring the boot logs in a method corresponding to the operating state comprises:
transferring the boot logs to a first target memory device using Direct Memory Access (DMA) after the target type of logs is written to the second target area, wherein the first target memory device is a volatile memory in a Baseboard Management Controller (BMC);
performing, via an expansion interface, dumping in the second target area to dump the boot logs to a non-volatile memory of a BMC, to obtain the boot logs.

7. The method as claimed in claim 6, wherein the determining a second target area comprises:
determining a first address of the second target area and a data capacity of the second target area, wherein the data capacity is a maximum data storage volume of the second target area;
determining an end address of the second target area based on the first address and the data capacity; and
determining space from the first address to the end address in a second target memory device as the second target area.

8. The method as claimed in claim 7, wherein after the determining a second target area, the method comprises:

sending the first address and the data capacity to a BMC system in the target device via an IPMI command.

9. The method as claimed in claim 6, wherein the determining an operating state of the target device based on a type of logs written to the boot logs of the second target area within a preset duration comprises:

reading the boot logs written to the second target area within the preset duration, and determining a type of each log in the boot logs; and in response to a target type of logs does not exist in the boot logs, determining that the operating state of the target device is the abnormal operation state, wherein a log of the target type of logs is a log indicating that the target device completes a self-test;

in response to the target type of logs exists in the boot logs, determining that the operating state of the target device is the normal operation state.

10. The method as claimed in claim 9, wherein the transferring the boot logs in a method corresponding to the operating state comprises:

in response to the operating state of the target device being the normal operation state, determining the first target memory device in a BMC system of the target device after determining that the target type of logs is written to the second target area, wherein the first target memory device is a transitory memory device; and writing the boot logs to the first target memory device in a Direct Memory Access (DMA) manner.

11. The method as claimed in claim 10, wherein the determining a first target memory device in a BMC system of the target device comprises:

determining a plurality of transitory memory devices that perform data transfer with the target device via a Peripheral Component Interconnect Express (PCIe) link; and determining, as the first target memory device, a transitory memory device that is among the plurality of transitory memory devices and in data communication with the BMC system.

12. The method as claimed in claim 7, wherein the boot logs are written to the second target memory device in the following method:

determining a quantity of bytes of a first to-be-written boot log, and determining a new address based on the first address and the quantity of bytes, wherein the first to-be-written boot log is a log, currently to be written to the second target area, in the boot logs, the new address is a start address at which a second to-be-written boot log is written to the second target area after the first to-be-written boot log is written to the second target area, and the second to-be-written boot log is a log that follows the first to-be-written boot log;

comparing the new address with the end address, to obtain a comparison result; and in response to the new address being greater than the end address, refusing to write the first to-be-written boot log to the second target area;

in response to the new address being less than or equal to the end address, allowing to write the first to-be-written boot log to the second target area.

13. The method as claimed in claim 6, wherein the method further comprises:

modifying a read object of the second target area to a Basic Input/Output System (BIOS) of the target device by the BIOS of the target device and an operating system of the target device.

14. The method as claimed in claim 6, the method comprising:

determining a first target memory device, wherein the first target memory device is a volatile memory device in a management system of a target device;

receiving a boot command, and starting a timing program based on the boot command, wherein the timing program is configured to control the target device to perform timing for a preset duration;

determining an operating state of the target device based on an operation result of the timing program, wherein the operating state comprises a normal operation state and an abnormal operation state; and transferring boot logs in a method corresponding to the operating state, wherein the boot logs are all logs of the target device in a boot process;

wherein determining an operating state of the target device based on an operation result of the timing program comprises:

detecting the first target memory device within a preset duration, to obtain a detection result, and determining the operating state of the target device based on the detection result, wherein the detection result comprises the first target memory device receiving the boot logs within the preset duration, or the first target memory device not receiving the boot logs within the preset duration.

15. A server, comprising: a Baseboard Management Controller (BMC), a BIOS module, and a memory device, wherein the memory device is configured to store boot logs of the server;

the BMC is configured to determine whether the server operates normally or operates abnormally by the following method:

detecting whether a transitory memory device in the BMC receives boot logs within a preset duration, to obtain and providing a detection result, and determining the operating state of the target device based on the detection result;

wherein:

in response to the detection result indicating that the transitory memory device receives the boot logs within the preset duration, determining the operating state of the target device as the normal operation state;

in response to the detection result indicating that the transitory memory device does not receive the boot logs within the preset duration, determining the operating state of the target device as the abnormal operation state;

the BIOS module is configured to transfer the boot logs in the memory device to the transitory memory device in the BMC using Direct Memory Access (DMA) when the server operates normally; and wherein the BMC is further configured to obtain the boot logs from the memory device via an expansion interface and dump the boot logs from the memory device to a non-transitory memory device of the BMC when the server operates abnormally.

* * * * *